(12) United States Patent
Sato

(10) Patent No.: US 6,577,456 B2
(45) Date of Patent: Jun. 10, 2003

(54) SINGLE FOCUS LENS

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/091,282

(22) Filed: Mar. 6, 2002

(65) Prior Publication Data
US 2003/0048549 A1 Mar. 13, 2003

(30) Foreign Application Priority Data

Mar. 29, 2001 (JP) ........................................ 2001-095179
Mar. 29, 2001 (JP) ........................................ 2001-095180

(51) Int. Cl.[7] .............................. G02B 9/06; G02B 9/04; G02B 13/18
(52) U.S. Cl. ........................ 359/794; 359/793; 359/717
(58) Field of Search ................................ 359/793, 794, 359/646, 717, 691

(56) References Cited

U.S. PATENT DOCUMENTS

| 5,067,803 | A | | 11/1991 | Ohno |
| 5,546,237 | A | * | 8/1996 | Fukumoto ............... 359/794 |
| 5,557,463 | A | * | 9/1996 | Ueno ....................... 359/646 |
| 5,666,234 | A | | 9/1997 | Ohno |
| 5,677,798 | A | | 10/1997 | Hirano et al. |
| 5,739,965 | A | | 4/1998 | Ohno |
| 5,973,859 | A | * | 10/1999 | Abe ......................... 359/794 |
| 5,999,337 | A | * | 12/1999 | Ozaki ...................... 359/793 |
| 6,078,435 | A | * | 6/2000 | Yoneyama ............... 359/691 |
| 6,335,835 | B1 | * | 1/2002 | Koike ...................... 359/717 |
| 6,359,738 | B1 | * | 3/2002 | Nakamura et al. ...... 359/691 |

FOREIGN PATENT DOCUMENTS

| JP | 2-77712 | 3/1990 |
| JP | 7-50246 | 5/1995 |

* cited by examiner

Primary Examiner—Evelyn Lester
Assistant Examiner—Jack Dinh
(74) Attorney, Agent, or Firm—Arnold International; Bruce Y. Arnold

(57) ABSTRACT

A single focus lens formed of only two lens groups, both of positive refractive power, with each lens group being formed of only a single lens. The lens of the first lens group has at least one of its surfaces aspherical, and the lens element of the second lens group has at least one of its surfaces aspherical and is convex on the object side. In addition, the following conditions are satisfied in order to provide a single focus lens suitable for use in a highly portable, compact camera, such as a digital camera:

$\upsilon_{d2} > 50$ $|f/f_1| < 0.75$ where $\upsilon_{d2}$ is the Abbe number, at the d line, of the lens element that forms the second lens group, f is the focal length of the single focus lens, and $f_1$ is the focal length of the lens that forms the first lens group.

6 Claims, 8 Drawing Sheets

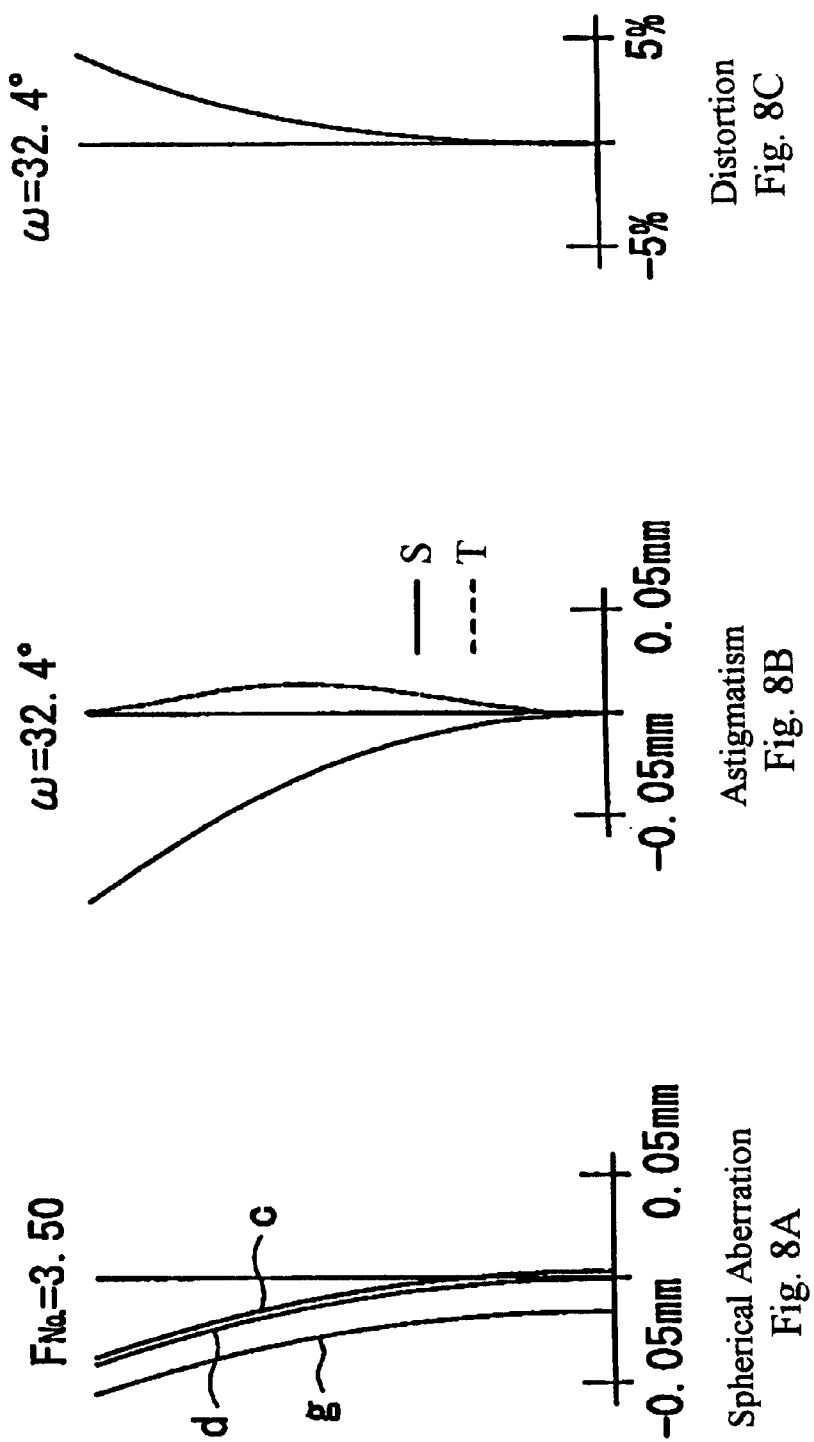

SINGLE FOCUS LENS

BACKGROUND OF THE INVENTION

Recently, digital cameras which can photograph an object using a solid-state image sensing device such as a CCD (Charge-Coupled Device) array instead of a silver salt film have become popular. As for digital cameras in general, there are still cameras for still picture photography and video cameras for motion picture photography.

Recently, along with the trend toward miniaturization of CCD array elements for providing higher resolution image detection in digital cameras, there has been an increasing demand for higher resolution and shorter focal length lenses for use in these cameras. In order to miniaturize a photographic lens, in general, it can be said that "the smaller the number of lens elements, the better". As an example of a photographic lens having a small number of lens elements, a triplet-type lens consisting of three lens elements in three lens groups is conventionally known. However, a triplet-type lens is insufficient in terms of simplicity of construction, compactness, and cost.

In Japanese Patent Publication H7-050246 a photographic lens consisting of two lens elements in two lens groups is disclosed. It consists of, in order from the object side, a meniscus lens element of negative refractive power and a biconvex lens element, wherein one lens surface is made to be aspherical. However, this photographic lens is unsuitable for use in a compact, digital camera. For example, in a compact, digital camera loaded with a CCD array that is about 2 mm in diameter, the distance from the first lens surface to the image surface must be about 3 mm or less. The photographic lens described in the Japanese Patent Publication H7-050246 is not compact enough to meet such a requirement.

BRIEF SUMMARY OF THE INVENTION

The present invention relates to a photographic lens used in a digital camera. More particularly, the present invention is a single focus lens that is suitable for use as the main lens of a highly portable, compact digital camera.

The object of the present invention is to provide a single focus lens that has a simple construction and an overall length that is sufficiently short for use in a compact digital camera.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 8A–8C show the spherical aberration, astigmatism, and distortion, respectively, of the single focus lens of Embodiment 4.

DETAILED DESCRIPTION

The single focus lens of the present invention is formed of a first lens of positive refractive power with at least one of its surfaces aspherical, and a second lens element of positive refractive power having a convex surface on the object side and at least one of its surfaces aspherical. The aspherical surfaces have a shape defined by Equation (A) below:

$$Z(h)=Ch^2/\{1+(1-KC^2h^2)^{1/2}\}+A_4h^4+A_6h^6+A_8h^8+A_{10}h^{10} \quad \text{Equation (A)}$$

where

Z is the length (in mm) of a line drawn from a point on the aspherical surface at distance h from the optical axis to the tangential plane of the aspherical surface vertex, C (=1/R) is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients.

In addition, the following Conditions (1) and (2) are preferably satisfied:

$$\nu_{d2} > 50 \quad \text{Condition (1)}$$

$$|f/f_1| < 0.75 \quad \text{Condition (2)}$$

where $\nu_{d2}$ is the Abbe number, at the d line, of the second lens element, f is the focal length of the single focus lens, and $f_1$ is the focal length of the first lens.

It is desirable that, in addition to satisfying Condition (2) above, the following Condition (3) is additionally satisfied:

$$|f/f_1| < 0.65 \quad \text{Condition (3)}$$

where f and $f_1$ are as defined above.

In the single focus lens of the present invention, because each lens is of positive refractive power with at least one surface aspherical, it is easy to correct the various aberrations and to make the overall length of the single focus lens short. Also, by satisfying the above Condition (1), chromatic aberrations can easily be favorably corrected.

In addition, the first lens may be of a meniscus shape and be made of an optical resin material. By forming the first lens of an optical resin material, costs are reduced, especially the manufacturing costs associated with the aspherical processing. Also, by satisfying the above Condition (2), the refractive power of the first lens is restricted, preventing degradation of the optical performance caused by environmental changes which affect the optical properties of the optical resin material.

Figure 1:
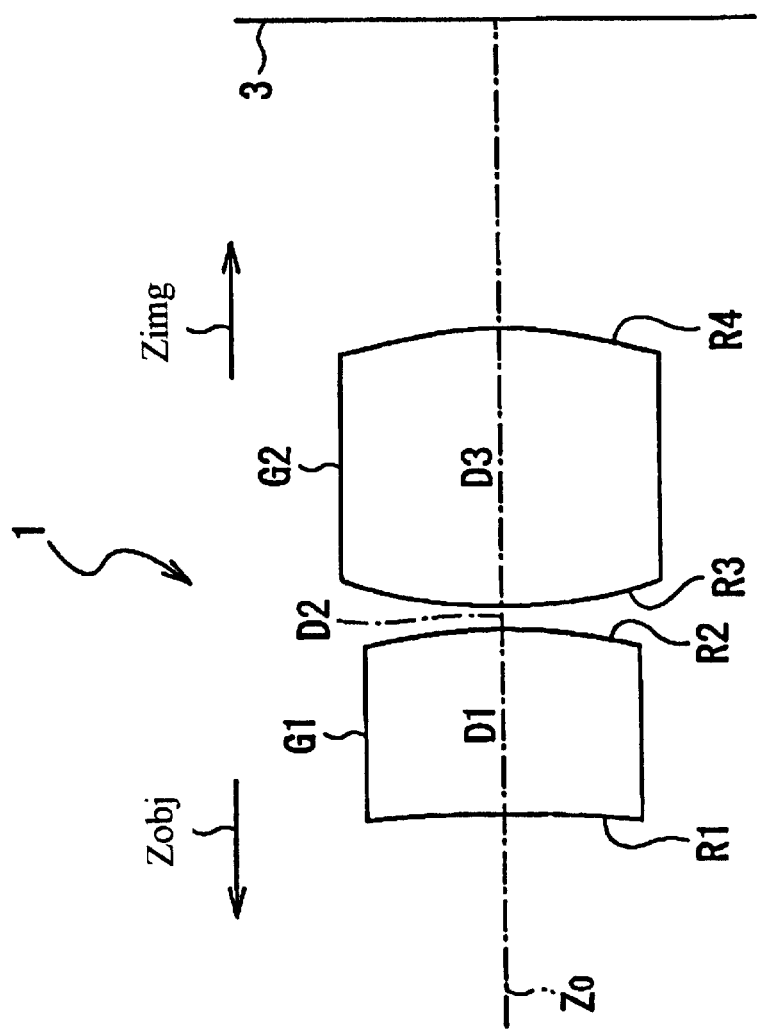
FIG. 1 shows the basic lens element configuration of the single focus lens of Embodiment 1.

The invention will first be discussed in general terms. FIG. 1 shows the basic lens element configuration according to one embodiment of the invention. In the figure, $Z_{OBJ}$ indicates the object side and $Z_{IMG}$ indicates the image side, with $Z_0$ being the optical axis. R1, R2 etc., refer to the radii of curvature of the surfaces, in order from the object side. D1, D2, etc., refer to the on-axis spacings between surfaces, in order from the object side. The single focus lens 1 of the present invention may be used as the photographic lens of a compact digital camera, for example. In this situation, an image-sensing device, such as a CCD array, would be installed at the image plane 3.

As shown in FIG. 1, the single focus lens 1 is formed of a first lens group G1 and a second lens group G2, in order from the object side. Each lens group is formed of a single lens. The first lens group G1 has positive refractive power and at least one of its surfaces is aspherical. The second lens group G2 has positive refractive power and a convex surface on the object side, with at least one of its surfaces aspherical.

Figure 3:
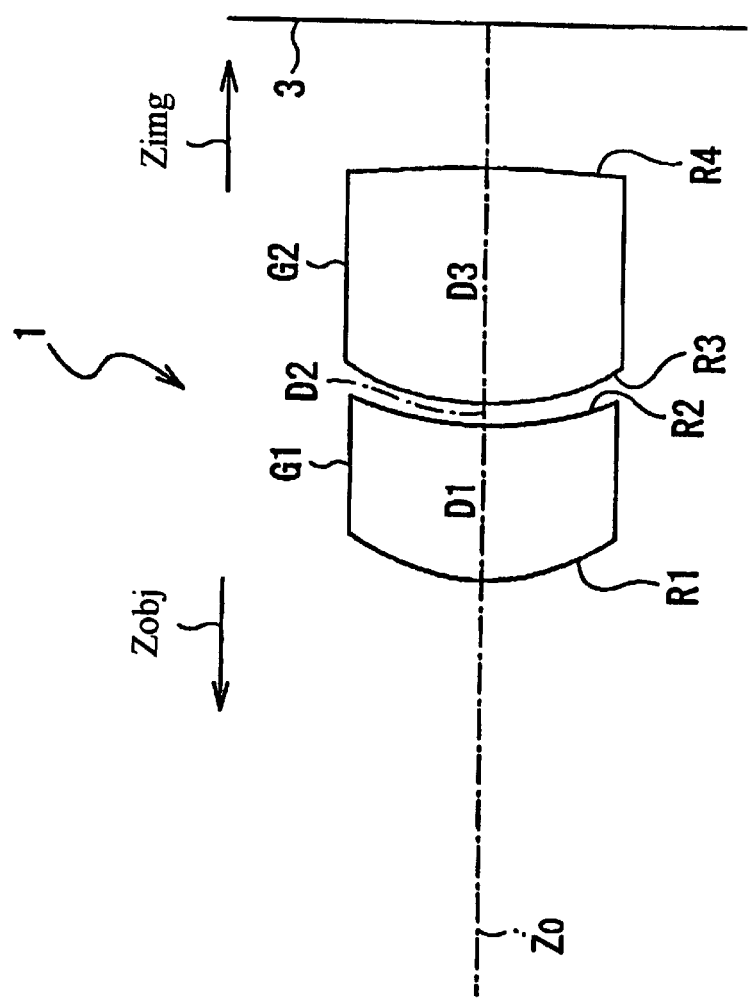
FIG. 3 shows the basic lens element configuration of the single focus lens of Embodiment 2.
Figure 5:
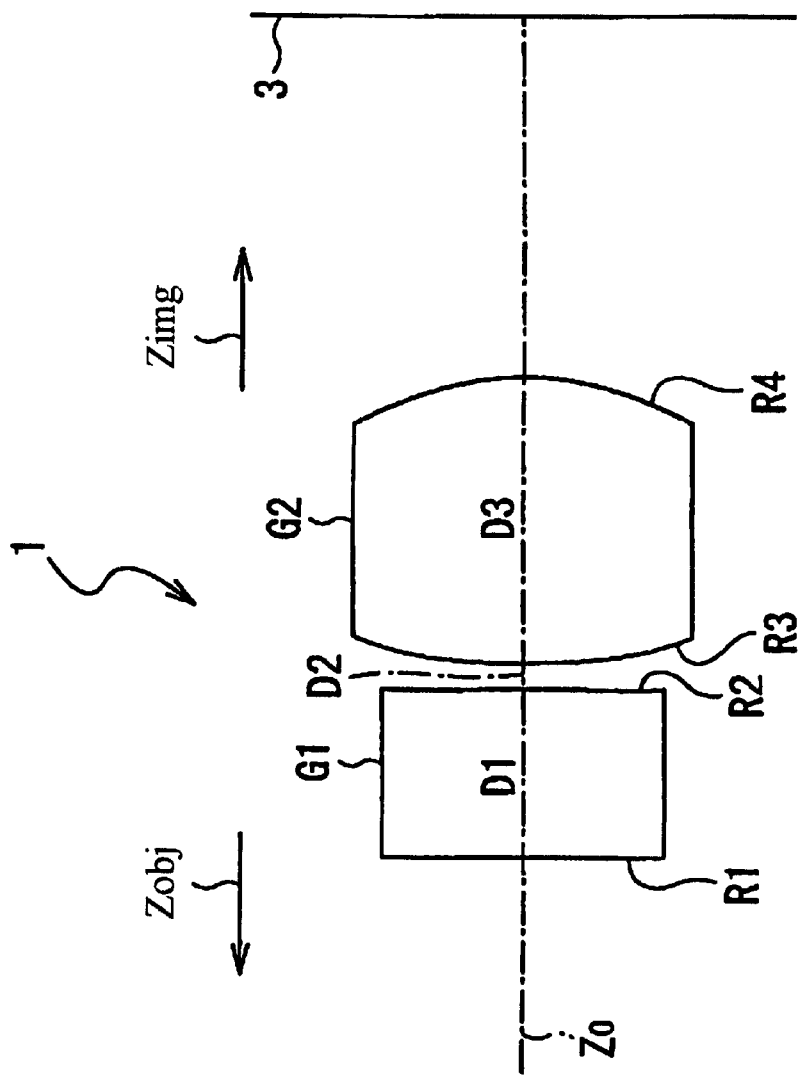
FIG. 5 shows the basic lens element configuration of the single focus lens of Embodiment 3.
Figure 7:
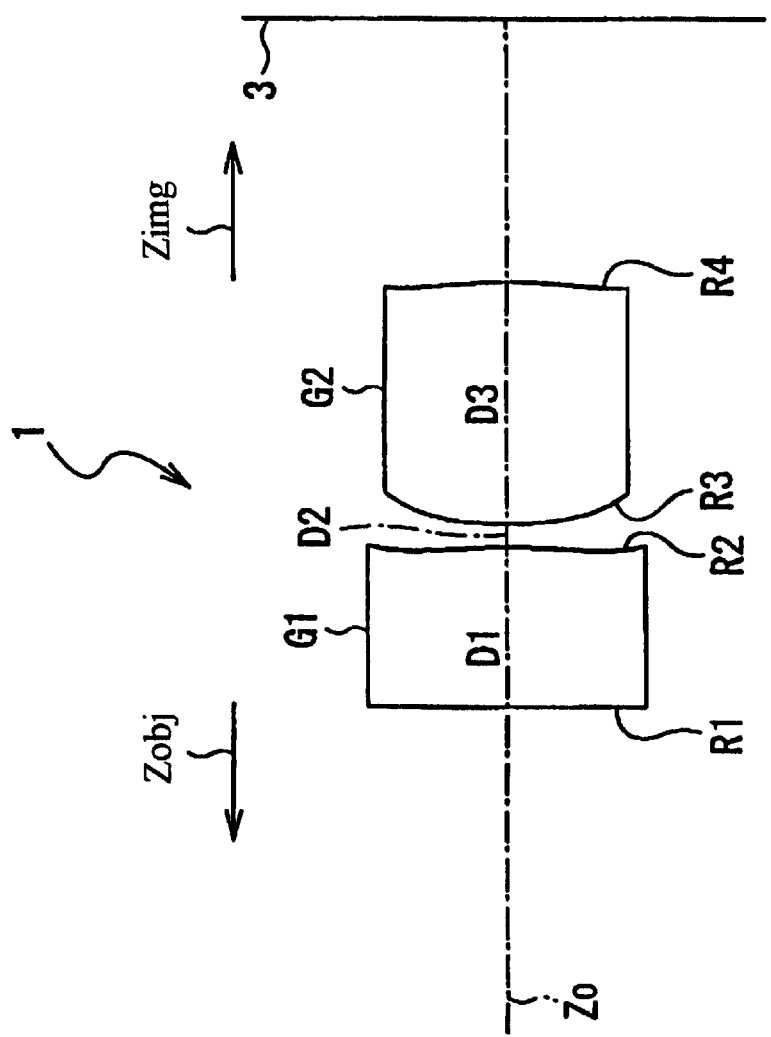
FIG. 7 shows the basic lens element configuration of the single focus lens of Embodiment 4.

Although the first lens group G1 is illustrated in FIG. 1 as being a meniscus lens with its concave surface on the object side, it can instead be a meniscus lens with its convex surface on the object side as illustrated in FIG. 3, or a plano-convex lens with its planar surface on the object side, as illustrated in FIGS. 5 and 7.

In the single focus lens 1, each of the first lens group G1 and the second lens group G2 is formed of a single lens element of positive refractive power and has at least one of its surfaces aspherical. Despite the single focus lens being of a simple two-group, two lens construction, the various aberrations are favorably corrected and the single focus lens has a very short overall length. Therefore, when used in a compact digital camera that uses a CCD array having a diameter of about 2 mm, the single focus lens can easily meet the requirement that the distance from the first lens surface to the image surface be about 3–4 mm or less.

In addition, by using an optical resin material for the first lens group G1, cost reductions can be achieved despite at least one surface of the first lens group being manufactured as an aspherical surface.

The purpose of the above Conditions (1)–(3) will now be discussed.

Condition (1) restricts the optical properties of the lens material used for the optical element of the second lens group G2, so as to enable the chromatic aberrations to be favorably corrected. If Condition (1) is not satisfied, correction of chromatic aberrations will become especially difficult.

Condition (2) restricts the refractive power of the first lens group. In general, in a lens formed of an optical resin material, optical properties such as the focal length and so on change when the lens is subjected to environmental changes, such as temperature and humidity. These changes in optical performance become more significant as the refractive power of a lens becomes stronger. Therefore, when an optical resin material is used for the lens that forms the first lens group G1, by restricting the refractive power of the lens material so that it satisfies Condition (2), degradation of optical performance with environmental changes is minimized. If Condition (2) is not satisfied, the refractive power of the lens that forms the first lens group G1 is too strong, thereby undesirably increasing the influence that changes in temperature and humidity have on optical performance.

Condition (3) is similar in purpose to Condition (2), but more restrictive.

Various embodiments of the invention will now be set forth in detail.

Embodiment 1

FIG. 1 shows the basic lens element configuration of a single focus lens 1 according to Embodiment 1. As this figure was discussed above in discussing the invention in general terms, it will not be further discussed here.

Table 1 below lists the surface number # in order from the object side, the radius of curvature R (in mm) near the optical axis of each surface, the spacing D (in mm) between surfaces, as well as the index of refraction $N_d$ and the Abbe number $\nu_d$ (for the d line, $\lambda$=587.6 nm) for each lens element of Embodiment 1. Those surfaces that are aspherical in Table 1 are listed with a * to the right of the surface number. In the middle portion of the table are listed the focal length f (the table data has been normalized, for convenience, so that f equals 1 mm), the F-number $F_{NO}$, and the image angle $2\omega$. In the bottom portion of the table are listed the aspherical constants of the aspherical surfaces. These constants define the shape of the aspherical surfaces according to Equation (A) above. An "E" in the data listed in the bottom portion of the table indicates that the number following the "E" is the exponent to the base 10. For example, "1.0E–02" represents the number $1.0\times10^{-2}$.

TABLE 1

| # | R | D | $N_d$ | $\nu_d$ |
|---|---|---|---|---|
| 1* | −5.3259 | 0.4435 | 1.50848 | 56.4 |
| 2* | −1.3312 | 0.0554 | | |
| 3* | 1.6634 | 0.6652 | 1.49700 | 81.6 |
| 4* | −0.9247 | | | |

| | f = 1.00 | $F_{NO}$ = 2.8 | $2\omega$ = 68.1° | |

| # | K | $A_4$ | $A_6$ | $A_8$ | $A_{10}$ |
|---|---|---|---|---|---|
| 1 | 97.8956 | −3.3733E−01 | −1.2932E−01 | −2.8489E−03 | −2.7015E−05 |
| 2 | −3.6141 | 1.7345E−02 | 3.3518E−02 | −3.3321E−04 | −2.9017E−06 |
| 3 | −7.5135 | 1.3855 | −3.3064 | −1.2091E−02 | 1.5668E−02 |
| 4 | −0.9131 | 9.9056E−01 | −2.3270E−01 | −1.4730E−01 | −1.1103E−02 |

In Table 2 below are listed the values that correspond to the above Conditions (1)–(3).

TABLE 2

| | |
|---|---|
| Condition (1) value of $\nu_{d2}$ = | 81.6 |
| Condition (2), (3) value of $|f/f_1|$ = | 0.30 |

As is apparent by comparing the above values with Conditions (1)–(3), each of Conditions (1)–(3) is satisfied by Embodiment 1.

Figure 2:
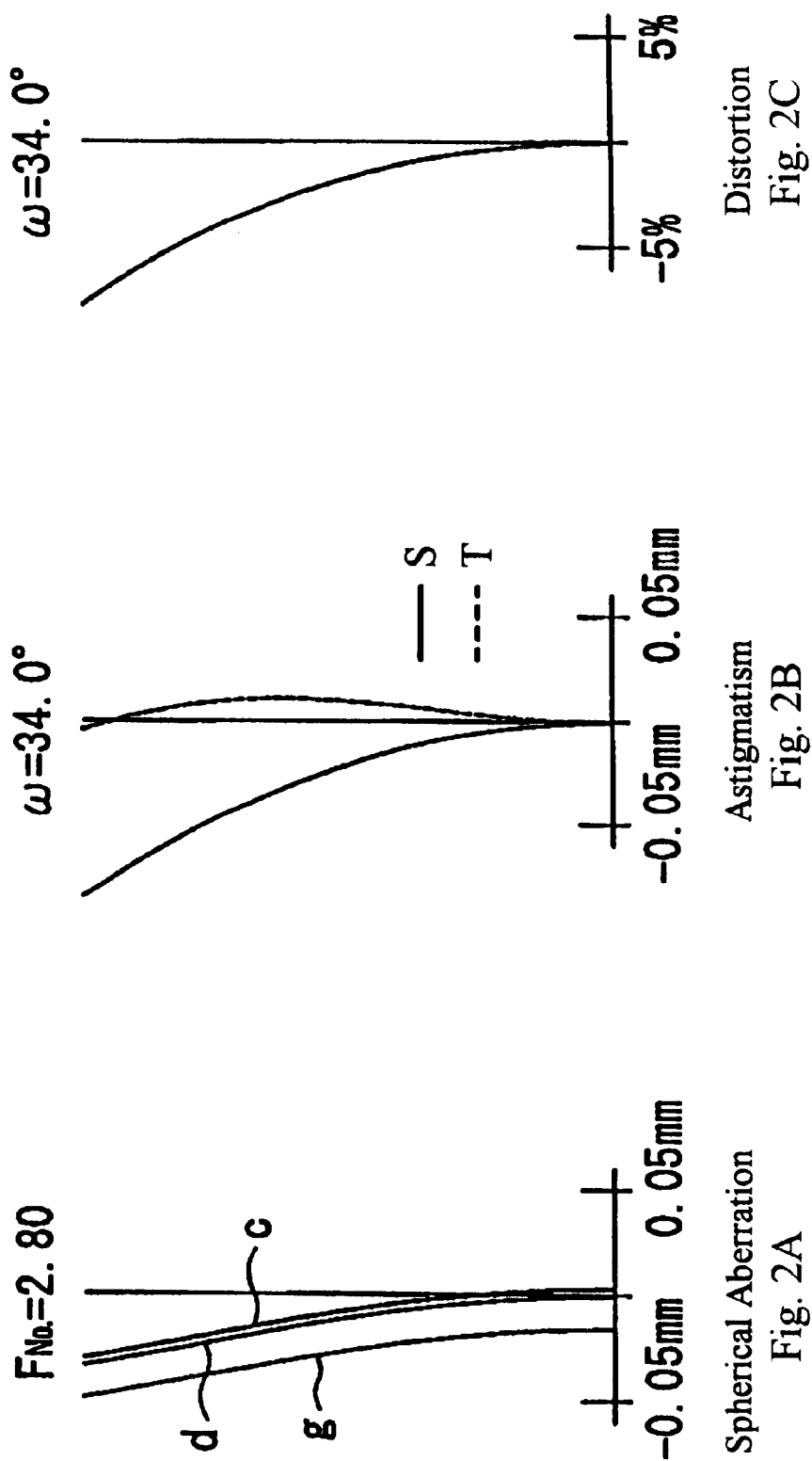
FIGS. 2A–2C show the spherical aberration, astigmatism, and distortion, respectively, of the single focus lens of Embodiment 1.

FIGS. 2A–2C show the spherical aberration, astigmatism, and distortion, respectively, for the single focus lens of Embodiment 1. In FIG. 2A, the spherical aberration is shown for the g, d, and C lines (i.e., $\lambda$=435.8 nm, $\lambda$=587.6 nm, and $\lambda$=656.3 nm, respectively). The astigmatism and distortion illustrated in FIGS. 2B and 2C, respectively, are for the d line, and $\omega$ represents the half-image angle. In FIG. 2B, astigmatism is illustrated for both the sagittal (S) and tangential (T) image planes. As is apparent from these figures, the various aberrations are favorably corrected for Embodiment 1.

Embodiment 2

FIG. 3 shows the basic lens element configuration of a single focus lens 1 according to Embodiment 2. This embodiment differs from Embodiment 1 in that, in Embodiment 2, the meniscus lens that forms the first lens group G1 has its convex surface on the object side.

Table 3 below lists the surface number # in order from the object side, the radius of curvature R (in mm) near the optical axis of each surface, the spacing D (in mm) between surfaces, as well as the index of refraction $N_d$ and the Abbe number $\upsilon_d$ (for the d line, λ=587.6 nm) for each lens element of Embodiment 2. Those surfaces that are aspherical in Table 3 are listed with a * to the right of the surface number. In the middle portion of the table are listed the focal length f (the table data has been normalized, for convenience, so that f equals 1 mm), the F-number $F_{NO.}$, and the image angle 2ω. In the bottom portion of the table are listed the aspherical constants of the aspherical surfaces. These constants define the shape of the aspherical surfaces according to Equation (A) above. An "E" in the data listed in the bottom portion of the table indicates that the number following the "E" is the exponent to the base 10. For example, "1.0E–02" represents the number $1.0 \times 10^{-2}$.

TABLE 3

| # | R | D | $N_d$ | $\nu_d$ |
|---|---|---|---|---|
| 1* | 0.5132 | 0.3872 | 1.50848 | 56.4 |
| 2* | 0.7598 | 0.0553 | | |
| 3* | 0.8362 | 0.5809 | 1.49700 | 81.6 |
| 4* | -2.2141 | | | |

| | f = 1.00 | $F_{NO = 3.5}$ | 2ω = 68.1° | |
|---|---|---|---|---|

| # | K | $A_4$ | $A_6$ | $A_8$ | $A_{10}$ |
|---|---|---|---|---|---|
| 1 | 0.4025 | -2.7993E-01 | 9.8286E-02 | 2.4020E-02 | 1.2487E-03 |
| 2 | -22.2863 | 1.7026 | 3.4371E-01 | 4.1703E-03 | 3.0642E-05 |
| 3 | -10.6032 | 3.3371 | -3.4891 | -1.3421E-02 | 1.5964E-02 |
| 4 | 12.8586 | 7.4988E-01 | -1.0254 | -8.4053E-02 | -8.9622E-03 |

In Table 4 below are listed the values that correspond to the above Conditions (1)–(3).

TABLE 4

| Condition (1) value of $\nu_{d2}$ = | 81.6 |
|---|---|
| Condition (2), (3) value of $|f/f_1|$ = | 0.49 |

As is apparent by comparing the above values with Conditions (1)–(3), each of Conditions (1)–(3) is satisfied by Embodiment 2.

Figure 4:
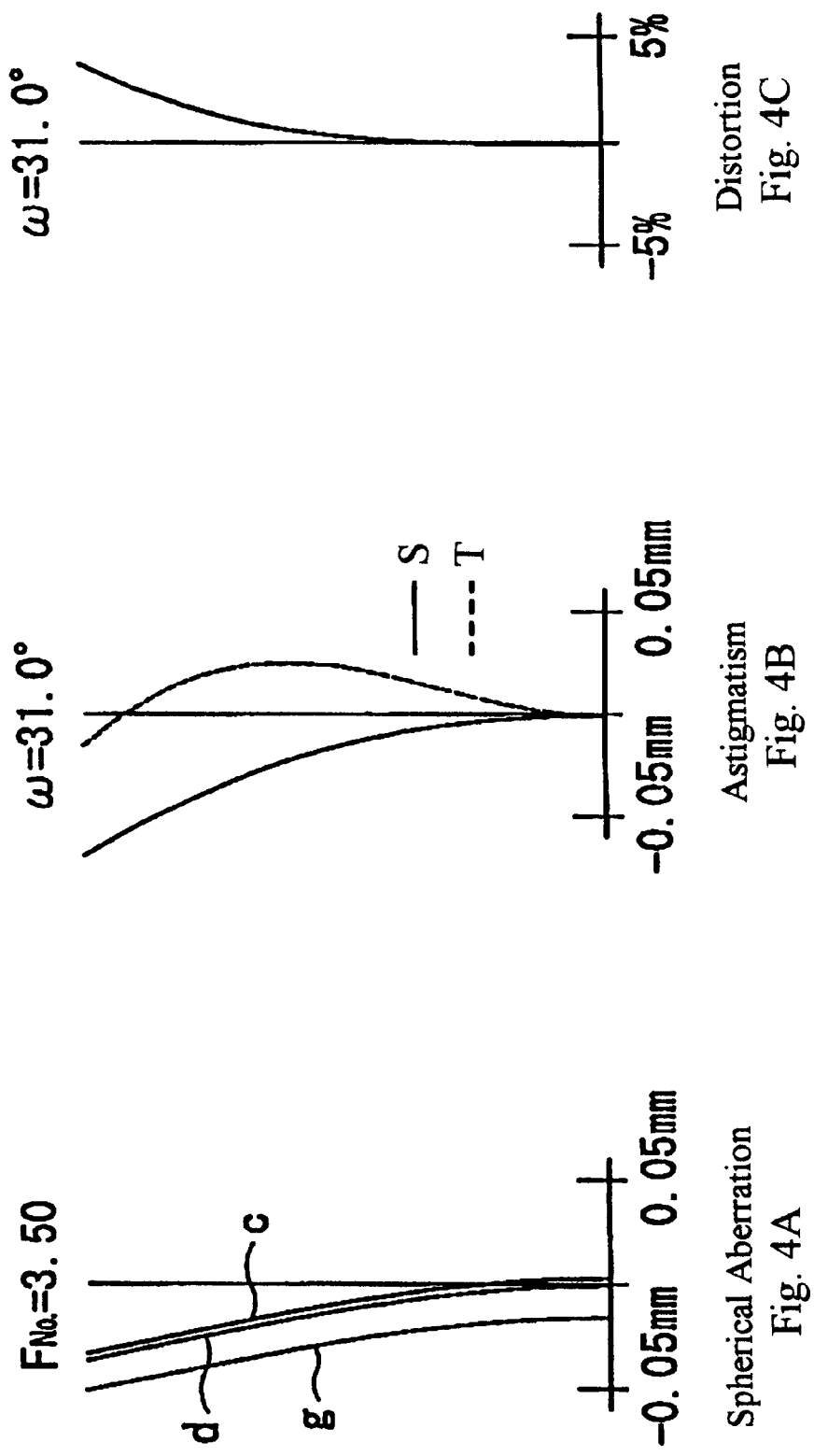
FIGS. 4A–4C show the spherical aberration, astigmatism, and distortion, respectively, of the single focus lens of Embodiment 2.

FIGS. 4A–4C show the spherical aberration, astigmatism, and distortion, respectively, for the single focus lens of Embodiment 2. In FIG. 4A, the spherical aberration is shown for the g, d, and C lines (i.e., λ=435.8 nm, λ=587.6 nm; and λ=656.3 nm, respectively). The astigmatism and distortion illustrated in FIGS. 4B and 4C, respectively, are for the d line, and ω represents the half-image angle. In FIG. 4B, astigmatism is illustrated for both the sagittal (S) and tangential (T) image planes. As is apparent from these figures, the various aberrations are favorably corrected for Embodiment 2.

Embodiment 3

FIG. 5 shows the basic lens element configuration of a single focus lens 1 according to Embodiment 3. This embodiment differs from Embodiments 1 and 2 in that, in Embodiment 3, the first lens group G1 is formed of a single lens that is plano-convex, with the convex surface being on the image side, aspherical, and of relatively weak refractive power as compared to the power of the second lens group G2. As in Embodiments 1 and 2, the second lens group G2 is of positive refractive power and has a convex surface on the object side, and at least one of its surfaces is aspherical.

Table 5 below lists the surface number # in order from the object side, the radius of curvature R (in mm) near the optical axis of each surface, the spacing D (in mm) between surfaces, as well as the index of refraction $N_d$ and the Abbe number $\nu_d$ (for the d line, $\lambda$=587.6 nm) for each lens element of Embodiment 3. Those surfaces that are aspherical in Table 5 are listed with a * to the right of the surface number. In the middle portion of the table are listed the focal length f (the table data has been normalized, for convenience, so that f equals 1 mm), the F-number $F_{NO.}$, and the image angle 2ω. In the bottom portion of the table are listed the aspherical constants of the aspherical surfaces. These constants define the shape of the aspherical surfaces according to Equation (A) above. An "E" in the data listed in the bottom portion of the table indicates that the number following the "E" is the exponent to the base 10. For example, "1.0E–02" represents the number $1.0 \times 10^{-2}$.

6B, astigmatism is illustrated for both the sagittal (S) and tangential (T) image planes. As is apparent from these figures, the various aberrations are favorably corrected for Embodiment 3.

Embodiment 4

FIG. 7 shows the basic lens element configuration of a single focus lens 1 according to Embodiment 4. The basic lens element configuration of this embodiment is similar to that of Embodiment 3.

Table 7 below lists the surface number # in order from the object side, the radius of curvature R (in mm) near the optical axis of each surface, the spacing D (in mm) between surfaces, as well as the index of refraction $N_d$ and the Abbe

TABLE 5

| # | R | D | $N_d$ | $\nu_d$ |
|---|---|---|---|---|
| 1 | ∞ | 0.3869 | 1.50848 | 56.4 |
| 2* | −3.3522 | 0.0553 | | |
| 3* | 2.5028 | 0.6633 | 1.49700 | 81.6 |
| 4* | −0.6387 | | | |

| | f = 1.00 | $F_{NO}$ = 2.8 | 2ω = 67.1° | |
|---|---|---|---|---|

| # | K | $A_4$ | $A_6$ | $A_8$ | $A_{10}$ |
|---|---|---|---|---|---|
| 2 | −2.3976 | 1.3491 | 6.3655E−02 | 6.8385E−04 | 3.2039E−07 |
| 3 | 24.6630 | 1.4853 | −3.3679 | −1.2562E−02 | 1.6076E−02 |
| 4 | −1.3155E−02 | 4.6925 | −8.1002E−02 | −1.3563E−01 | −1.0502E−02 |

In Table 6 below are listed the values that correspond to the above Conditions (1)–(3).

TABLE 6

| Condition (1) value of $\nu_{d2}$ = | 81.6 |
|---|---|
| Condition (2), (3) value of $|f/f_1|$ = | 0.15 |

As is apparent by comparing the above values with Conditions (1)–(3), each of Conditions (1)–(3) is satisfied by Embodiment 3.

Figure 6:
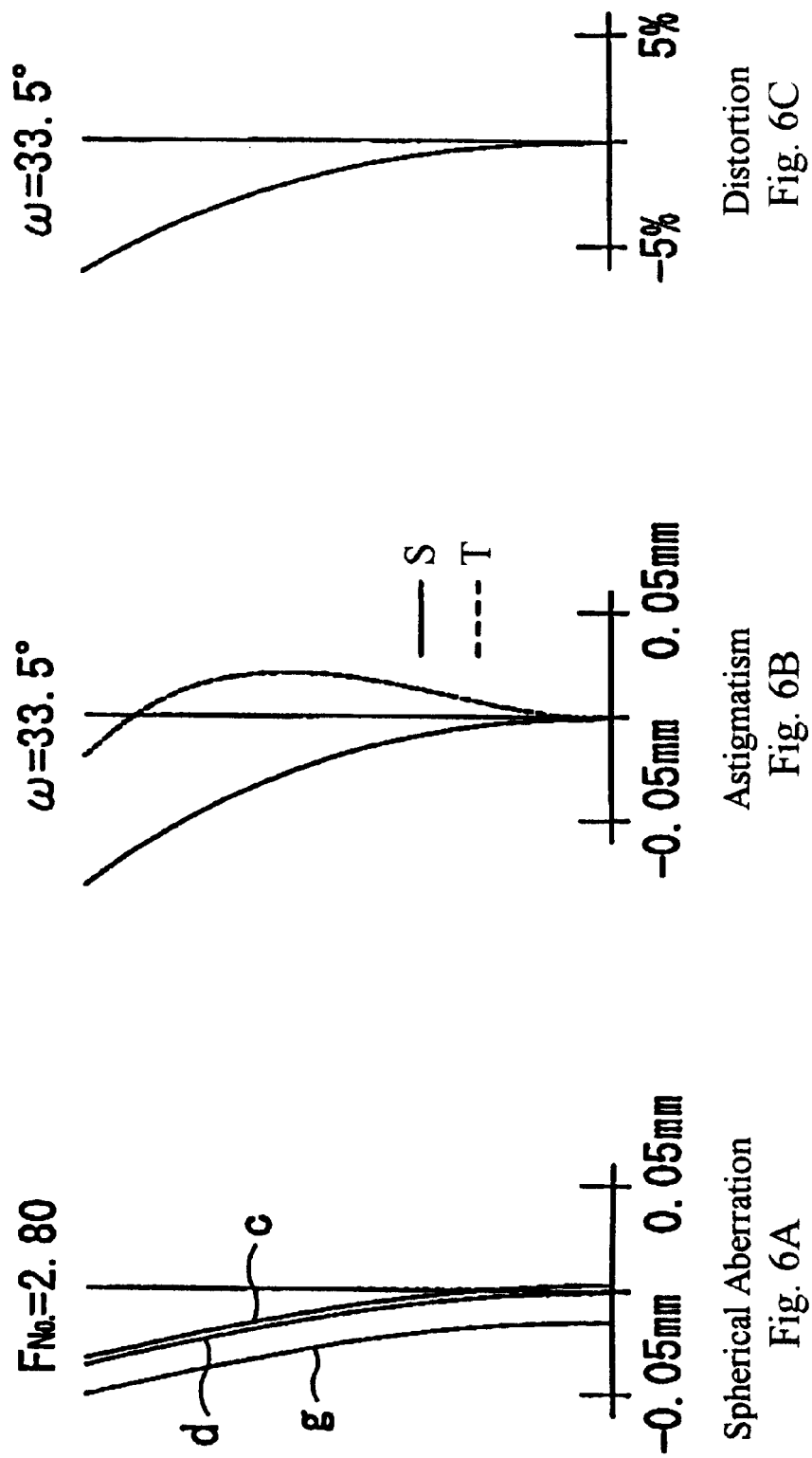
FIGS. 6A–6C show the spherical aberration, astigmatism, and distortion, respectively, of the single focus lens of Embodiment 3.

FIGS. 6A–6C show the spherical aberration, astigmatism, and distortion, respectively, for the single focus lens of Embodiment 3. In FIG. 6A, the spherical aberration is shown for the g, d, and C lines (i.e., $\lambda$=435.8 nm, $\lambda$=587.6 nm, and $\lambda$=656.3 nm, respectively). The astigmatism and distortion illustrated in FIGS. 6B and 6C, respectively, are for the d line, and ω represents the half-image angle. In FIG.

number $\nu_d$ (for the d line, $\lambda$=587.6 nm) for each lens element of Embodiment 4. Those surfaces that are aspherical in Table 7 are listed with a * to the right of the surface number. In the middle portion of the table are listed the focal length f (the table data has been normalized, for convenience, so that f equals 1 mm), the F-number $F_{NO.}$, and the image angle 2ω. In the bottom portion of the table are listed the aspherical constants of the aspherical surfaces. These constants define the shape of the aspherical surfaces according to Equation (A) above. An "E" in the data listed in the bottom portion of the table indicates that the number following the "E" is the exponent to the base 10. For example, "1.0E–02" represents the number $1.0 \times 10^{-2}$.

TABLE 7

| # | R | D | $N_d$ | $\nu_d$ |
|---|---|---|---|---|
| 1 | ∞ | 0.4128 | 1.50848 | 56.4 |
| 2* | −1.4743 | 0.0590 | | |
| 3* | 1.2730 | 0.6192 | 1.49700 | 81.6 |
| 4* | −1.2375 | | | |

| | f = 1.00 | $F_{NO}$ = 3.5 | 2ω = 65.0° | |
|---|---|---|---|---|

| # | K | $A_4$ | $A_6$ | $A_8$ | $A_{10}$ |
|---|---|---|---|---|---|
| 2 | −28.3606 | 2.2804 | 1.3945E−01 | 1.4319E−03 | 7.8643E−06 |
| 3 | −0.8032 | 5.1804 | −2.4554 | −8.0144E−03 | 8.9842E−03 |
| 4 | −0.5426 | 2.4854 | 2.8576E−02 | −8.8632E−02 | −6.1670E−03 |

In Table 8 below are listed the values that correspond to the above Conditions (1)–(3).

TABLE 8

| | |
|---|---|
| Condition (1) value of $\nu_{d2}$ = | 81.6 |
| Condition (2), (3) value of $|f/f_1|$ = | 0.34 |

As is apparent by comparing the above values with Conditions (1)–(3), each of Conditions (1)–(3) is satisfied by Embodiment 4.

FIGS. 8A–8C show the spherical aberration, astigmatism, and distortion, respectively, for the single focus lens of Embodiment 4. In FIG. 8A, the spherical aberration is shown for the g, d, and C lines (i.e., λ=435.8 nm, λ=587.6 nm, and λ=656.3 nm, respectively). The astigmatism and distortion illustrated in FIGS. 8B and 8C, respectively, are for the d line, and ω represents the half-image angle. In FIG. 8B, astigmatism is illustrated for both the sagittal (S) and tangential (T) image planes. As is apparent from these figures, the various aberrations are favorably corrected for Embodiment 4.

The invention being thus described, it will be obvious that the same may be varied in many ways. For example, the radii of curvature R and the on-axis surface spacings D may be readily scaled to obtain a lens of a desired focal length, and different optical materials may be used with an appropriate selection of the radii of curvature and the on-axis surface spacings. In addition, the single focus lens of the invention is not limited to use in digital cameras but can be used as the photographic lens in cameras that use silver salt films. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A single focus lens formed of only two lens groups, in order from the object side, as follows:

a first lens group formed of only a single lens of positive refractive power, with at least one of its surfaces aspherical; and a second lens group formed of only a single lens element of positive refractive power, with at least one of its surfaces aspherical and having a convex surface on the object side;

wherein the following Conditions are satisfied:

$\nu_{d2} > 50$ $|f/f_1| < 0.75$ where $\nu_{d2}$ is the Abbe number, at the d line, of the lens element that forms the second lens group, f is the focal length of the single focus lens, and $f_1$ is the focal length of the lens that forms the first lens group.

2. The single focus lens as described in claim 1, wherein the single lens that forms the first lens group is made of an optical resin material.

3. The single focus lens as described in claim 2, wherein the single lens that forms the first lens group has a meniscus shape with its convex surface on the object side, and further satisfies the following condition:

$|f/f_1| < 0.65$.

4. The single focus lens as described in claim 1, wherein the single lens that forms the first lens group has a plano-convex shape, with its planar surface on the object side.

5. The single focus lens as described in claim 4, wherein the single lens that forms the first lens is made of an optical resin material.

6. The single focus lens as described in claim 4, wherein the first lens group has less refractive power than the second lens group.

* * * * *